(12) United States Patent
Nath et al.

(10) Patent No.: US 9,017,488 B2
(45) Date of Patent: *Apr. 28, 2015

(54) PROCESS FOR REMOVING HYDROCARBONS AND NOXIOUS GASSES FROM REACTORS AND MEDIA-PACKED EQUIPMENT

(71) Applicant: Refined Technologies Inc., Spring, TX (US)

(72) Inventors: Cody Nath, Houston, TX (US); Barry Baker, Odem, TX (US); Sean Sears, The Woodlands, TX (US)

(73) Assignee: Refined Technologies, Inc., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,381

(22) Filed: Jul. 16, 2014

(65) Prior Publication Data
US 2014/0326141 A1 Nov. 6, 2014

Related U.S. Application Data

(63) Continuation of application No. 13/936,807, filed on Jul. 8, 2013, which is a continuation-in-part of application No. 12/478,580, filed on Jun. 4, 2009, now Pat. No. 8,480,812.

(51) Int. Cl.
*B08B 9/00* (2006.01)
*B08B 9/027* (2006.01)
*B01D 53/14* (2006.01)
*C11D 7/50* (2006.01)
*C11D 11/00* (2006.01)

(52) U.S. Cl.
CPC .............. *B01D 53/1487* (2013.01); *B08B 9/00* (2013.01); *C11D 7/5004* (2013.01); *C11D 11/0041* (2013.01); *B01D 53/1493* (2013.01); *B01D 2252/20* (2013.01)

(58) Field of Classification Search
CPC ............ B08B 5/00; B08B 9/00; B08B 9/027; B08B 9/0328
USPC ........... 134/22.1, 22.11, 22.14, 22.19, 26, 30, 134/31, 36, 37, 41
See application file for complete search history.

(56) References Cited

U.S. PATENT DOCUMENTS

| 5,035,792 A * | 7/1991 | Foutsitzis et al. ............. 208/138 |
| 5,730,804 A * | 3/1998 | Gomi et al. ................... 118/726 |
| 6,936,112 B2 * | 8/2005 | Jansen et al. .................... 134/19 |

* cited by examiner

*Primary Examiner* — Saeed T Chaudhry
(74) *Attorney, Agent, or Firm* — Wong, Cabello, Lutsch, Rutherford & Brucculeri LLP.

(57) ABSTRACT

A process for quickly removing hydrocarbon contaminants and noxious gases in a safe and effective manner from catalytic reactors, other media packed process vessels and associated equipment in the vapor phase without using steam. The cleaning agent contains one or more solvents, such as terpenes or other organic solvents. The cleaning agent is injected into contaminated equipment, along with a carrier gas, in the form of a cleaning vapor.

20 Claims, 1 Drawing Sheet

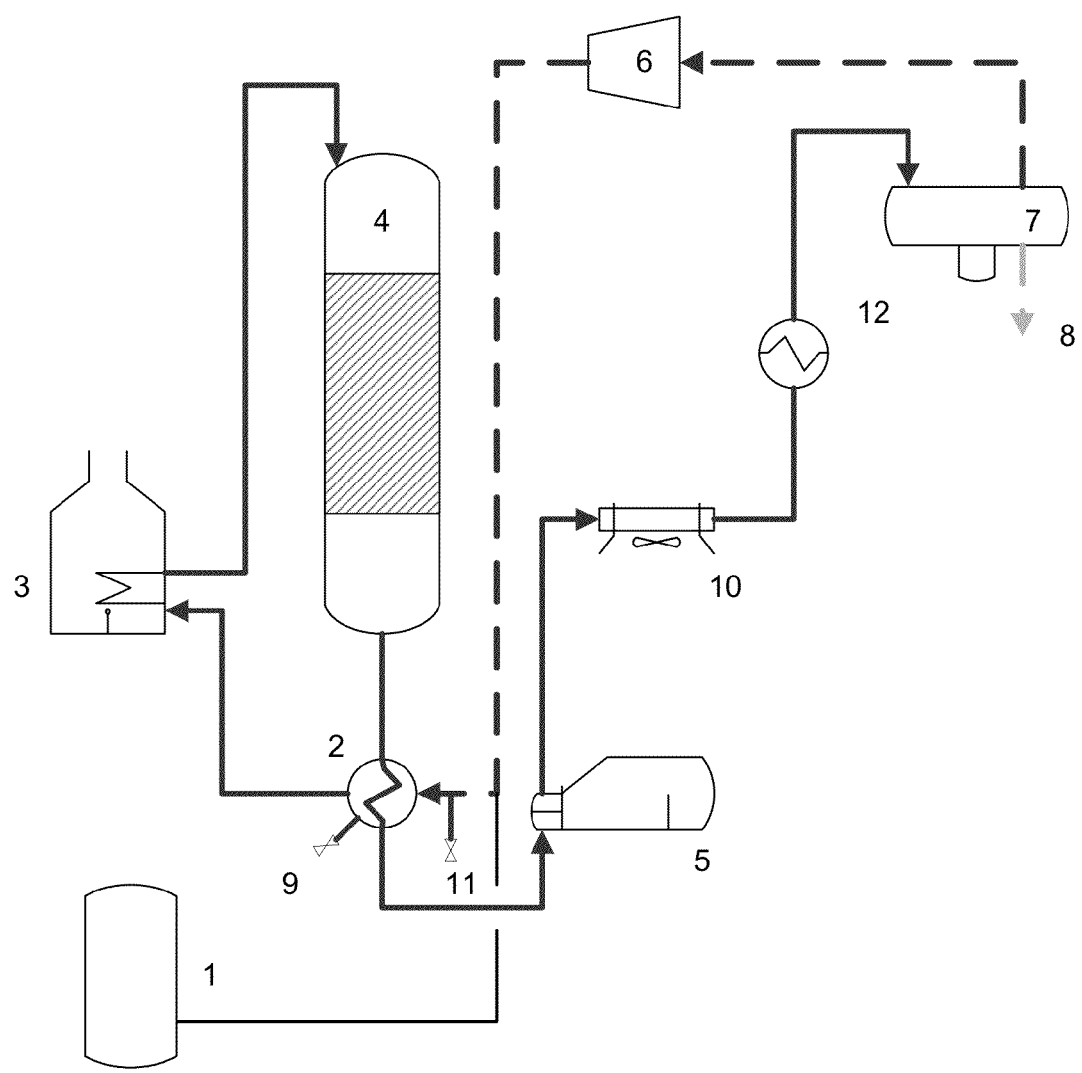

PROCESS FOR REMOVING HYDROCARBONS AND NOXIOUS GASSES FROM REACTORS AND MEDIA-PACKED EQUIPMENT

BACKGROUND

This disclosure pertains to the operation and maintenance of chemical plants and refineries. More specifically, the present disclosure relates to the process for cleaning the internal surfaces of chemically contaminated reactors, packed beds, absorbent chambers, compressors, pipes, connectors and other equipment.

Refineries and chemical plants must perform turnarounds on chemical processing units, which utilize reactors and other vessels containing packed media. The purpose of these turnarounds is to replace catalysts or other media that have lost the ability to perform. Performance measures include catalyst activity, pressure drop, yields, molecular sieve selectivity, etc.

When the turnarounds are being performed, the facility cannot upgrade refined products to higher value streams, resulting in irreversible loss of revenue to the refinery or chemical plant. Therefore, an incentive exists to minimize the duration of the outage and perform the change-out of the media as quickly and effectively as possible, while maintaining a safe work environment.

Moreover, new developments in environmental regulations and enforcement have led to more stringent emissions requirements. One of the major developments resulting from these regulations is the desire to minimize flaring from refining equipment. Many facilities have installed Flare Gas Recovery Units (FGRUs) to capture gases in the flare system and return them to the fuel gas system rather than flaring continuously. FGRUs typically consist of one or more liquid ring compressors capable of taking low pressure flare gas and pushing it into the fuel gas system or other medium pressure system. These new units are often mandated by Consent Decree agreements between refiners and the Environmental Protection Agency (EPA). As a result, there is significant environmental incentive to avoid flaring and to keep the gases within the constraints of the FGRUs when gases must be vented from the equipment. These constraints may include, for example, the following parameters.

1) Flow Rate:
The compressors are designed to capture a limited quantity of vapors in the flare system. If the compressors are overwhelmed the gas will be flared.

2) BTU Value:
Nitrogen is frequently used to clear noxious chemicals from refining equipment. There is a limitation on how much nitrogen can be sent to the fuel gas system via the FGRU because the nitrogen, which has no heating value, dilutes the fuel gas system and causes the plant heaters to operate abnormally. This can lead to further upsets, so the plant fuel gas BTU value is closely monitored.

3) Temperature:
Because the compressors are liquid ring compressors, there is a temperature limit which protects the compressors. Generally, temperatures above 170° F. are not allowed.

The process vessels are generally at the heart of a hydrocarbon processing facility but often cannot be isolated from adjacent supporting equipment. For example, a typical hydrotreating process unit in a petroleum refinery has a reactor containing a metal catalyst, a hydrogen compressor, shell and tube heat exchangers, a heater, air cooled fin tube exchangers, piping and other miscellaneous pressure vessels. All equipment in the process circuit can be collectively referred to as the reactor circuit. When a turnaround occurs on such a unit, the entire reactor circuit must be cleaned together because the compressor and heat exchangers are used to circulate a gas used to cool down the reactor at a regulated rate.

Under most circumstances, it may be desirable to ensure that the equipment in a reactor circuit are not exposed to water or steam due to concerns about technical items such as metallurgy, loss of catalyst activity and the destruction of expensive absorbent materials such as molecular sieves. Additionally, there are practical concerns with respect to materials inside the equipment which may form clumps when soaked with water, making them difficult to remove. Moreover, in the case of reactors in hydrotreating units, the shutdown and cool down procedure requires that the hydrogen compressor in the system remain online, and because hydrogen compressors cannot pump steam, it must be cleaned without using steam or aqueous cleaners that are otherwise commonly used in the industry.

One previously disclosed method for preparing reactor circuits for safe work involves a "hot sweep," where the heater in the reactor loop is used to raise the hydrogen stream temperature levels high enough to strip the heavy hydrocarbons from the catalyst as the hydrogen compressor circulates the gas. Following that step, the hydrogen is replaced with nitrogen by repetitively depressurizing the system to the flare system and pressuring it back up with nitrogen (commonly called a "huff and puff"). At that point, the compressor is restarted, sending the nitrogen through the reactor circuit at the same time that the continuous injection and purge of nitrogen is occurring. The purge stream is sent to the flare system. The process gradually decreases the concentration of noxious gases in the circuit and cools down the reactor. Depending on the design of the compressor, nitrogen availability and other considerations, the operator may use other gases instead of nitrogen, including purchased fuel gas (ethane and methane). These processes require enormous quantities of nitrogen, which is costly. The goal of the entire operation is to render the circuit safe for work (0% LEL, 0 PPM $H_2S$ and <100° F.). Depending on the size and state of the unit, the entire effort can take 3 or more days.

In cases where the "huff and puff" and nitrogen purge steps are sent to a flare system with an FGRU, the constraints mentioned above will govern the flow rate and therefore will set the duration of the activity. In systems that include flare gas recovery, the FGRU becomes the limiting factor of all or most hydrotreater shutdowns.

Another method known in the field for safely removing contaminated catalyst from a reactor is to perform a "wet dump." After the equipment is cooled down, the reactor is filled with water. The catalyst is subsequently dumped wet, effectively preventing fires and other hazards. Challenges to this method are time (system must be cooled down prior to introducing water), safe handling and disposal of hot water, increased amount of waste for disposal and difficulties involved in controlling a large system filled with hot catalyst and metal, mixed with cool water.

Although it is possible in some cases to isolate a process vessel for cleaning and decontamination, it is not always practicable to use steam or aqueous solutions to clean the equipment. For instance, a compressor is typically not available for circulating gas through the process internals. One such example is an adsorbent chamber in the Parex™ Process (UOP technology). One method for removing noxious gases from such equipment is purging with an inert gas, most commonly nitrogen. A common method is to pressure a system with nitrogen up to a certain pressure, then vent it down to a low pressure. These steps may be repeated until the atmosphere inside the system meets environmental and safety limits.

In some cases, a continuous flow of nitrogen is introduced at one point in a system while the same amount is vented (either to the flare system or to the atmosphere) at another point. The nitrogen reduces contaminants in the vessel through dilution. Often the equipment is vented to the flare during the nitrogen purges; however, purging directly to the atmosphere is possible once environmental limits have been reached. At that point, the vessel is opened at several points to the atmosphere and air blowers are used to remove the nitrogen and the last traces of noxious gases. The end goal of all of the processes involving nitrogen or other gases is to render the equipment dry of free oil and the internal atmosphere free of noxious gases.

In summary, most of these known methods are time-consuming and/or expensive to implement. Furthermore, any solution that requires further cleaning inside a confined space may introduce safety risk to the workers implementing the process.

BRIEF DESCRIPTION OF THE DRAWINGS

FIG. 1 illustrates the layout of equipment and the flow of media in a typical cleaning process.

DETAILED DESCRIPTION OF THE INVENTION

The disclosed embodiments introduce a non-aqueous cleaning agent or solvent that is not dependent upon water or steam as a carrier. The cleaning agent is carried into and through the equipment to be cleaned by a carrier gas that is free of water. The carrier gas volatilizes the solvent and delivers it throughout the internal spaces and surface areas of the equipment to be cleaned, allowing the solvent to quickly dissolve organic residues from the vessel and carry away noxious gases.

Furthermore, the present invention overcomes the constraints placed on refiners with FGRUs by expediting the procedure for freeing the equipment of noxious gases. By speeding up this process the refiner is able to reach environmental and safety limits faster so that the equipment can be vented to atmosphere. The invention may allow the refiner to reach these limits before the equipment is cool enough for safe work, so the FGRU is no longer limiting the timeline of the event. Once these limits are reached, the equipment can continue cooling to atmosphere.

In one embodiment, it is provided a method of cleaning contaminated equipment, the method may include the following steps:
  providing a carrier gas source which provides carrier gas such as nitrogen, purchased fuel gas, etc;
  providing a solvent source, preferably capable of supplying a non-aqueous solvent;
  delivering the carrier gas and solvent from their respective sources to the system to be cleaned; and
  removing said contaminant out of the system as the carrier gas and solvent are delivered to or through the system, wherein substantial amount of said contaminant is dissolved in said solvent in a vapor or liquid state as it is being removed from said system.

For purpose of this disclosure, the term "substantial" means at least 50%. The process system to be cleaned may be a reactor, an absorbent chamber containing a molecular sieve, or a pressure vessel. Such a process system may contain a medium which may be a catalyst, a support material, a molecular sieve or a desiccant. By way of example, a reactor circuit used in a refining hydrotreating process and associated equipment may be cleaned using the disclosed process. Associated equipment may include, for example, a shell and tube exchanger, a fired heater, a distillation tower, or an interconnecting piping.

The carrier gas may be nitrogen or other inert gases. Alternatively, the carrier gas may be a dry gas produced or used in a petroleum processing facility which has the chemical formula $C_nH_{2n+2}$, wherein n is an integer greater than 0 but less than 6. Examples of such dry gas include ethane or methane (commonly referred to as "purchased fuel gas" or refinery fuel gas), Other suitable carrier gas may include suitable gases that are readily available within a refinery or petrochemical plant, such as hydrogen used in a hydrotreating process.

The disclosed processes may be used to remove organic contaminants and noxious gases from a system. Organic contaminants may include but are not limited to crude oil and its derivatives produced through the refining process, or hydrocarbons. Noxious gases may include but are not limited to, hydrogen sulfide, benzene, carbon monoxide, and light end hydrocarbons which result in readings when testing an atmosphere for the Lower Explosive Limit (commonly referred to as LEL's).

In another aspect, the method of the present disclosure may include an additional step of circulating the carrier gas through the system using a compressor. In another aspect, the method may include a further step of bringing the vessel or system of equipment within the proper temperature range by either heating it or cooling it prior to the introduction of solvent.

In another aspect, the disclosed method may be used on equipment which is operating, such as a hydrotreater undergoing a nitrogen cool-down. In another aspect, the disclosed method may be used on equipment which is taken out of service for cleaning. Example for such application may include, by way of example, isolated vessel such as a Parex adsorbent chamber.

For equipment which is operating, the disclosed process may employ two potential delivery methods. In the first method, a solvent may be injected into a carrier gas. The mixture is in turn introduced into the equipment to clean its internal surfaces. Alternatively, in the second method, the actual process gas may be used as the carrier gas, utilizing the flow inside the process equipment to distribute the cleaning agents throughout the equipment to clean its internal surfaces. These two methods may have the advantage of keeping equipment online during a cleaning operation.

For equipment which will be taken out of service, the process may include following the standard shutdown procedure, properly isolating the equipment to be cleaned, injecting one or more solvents into a carrier gas, and introducing the carrier gas and solvent mixture into the equipment to clean its internal surfaces.

The described process is particularly well suited to cleaning large surface areas such as reactors with contaminated catalyst beds. A relatively small amount of cleaning fluid is required as compared to other known methods. The equipment used to introduce the cleaning agent may include a system of pumps, pipe fittings and, optionally, nozzles to vaporize and accurately control the volumetric ratios of chemical vapor and carrier gas. The injection rate and the volumetric or weight ratio between the solvent and the carrier gas depend on the nature of the equipment to be cleaned and may be adjusted accordingly. For instance, equipment with a larger enclosed volume generally requires a lower ratio of solvent to carrier gas. In one embodiment, the weight ratio between the solvent and the carrier gas is in the range of from about 0.1 to about 6.0, more preferably, from about 2 to about 4. The equipment used to introduce the carrier gas may include a heater to bring the gas to the appropriate temperature prior to injecting the chemical solvent(s). Preferably, the appropriate temperature is in the range from about 225° F. to about 400° F., more preferably from about 350° F. to about 400° F. In another aspect, a vent to the flare system, atmosphere or another piece of equipment is maintained throughout the injection. Low points in the system are preferably kept dry and free of liquid (such as condensed solvents and dissolved organic contaminants) throughout the injection.

In one embodiment, the solvent may be introduced into the carrier gas by joining or connecting the gas and solvent sources. In one aspect, the solvent may be introduced into an equipment that is idled or otherwise out of service. In another aspect, the solvent may be introduced into an equipment that is operating before, during and after the injection.

Once the solvent has been administered, the vessel is allowed to dwell and cool, with carrier gas continually delivered until safety limits have been reached for the temperature which is typically about 100° F. Preferably, the vent and drains remain open during this process.

The disclosed processes may be used to clean many process systems, such as reactor circuit and process vessel in a refinery or chemical plant which may be exposed to organic contaminants. These process systems may include, but are not limited to reactors, adsorbent chambers along with the auxiliary equipment associated with them such as shell and tube heat exchangers, piping, pressure vessels, fired heaters, distillation towers, and interconnecting piping. In one aspect, the adsorbent chamber suitable to be cleaned contains a molecular sieve. In another aspect, the process system contains a media packed pressure vessel containing internal processing equipment or material, including but not limited to catalyst, support material, molecular sieve or desiccant. In another aspect, the process system contains associated equipment which may include some or all components of a reactor circuit in a refining hydrotreating process.

Various solvents may be used for the present invention. The desired solvent may be directly added to the carrier gas. Suitable solvents may include any naturally occurring, synthetic or processed organic solvents (i.e., aliphatic, paraffinic, isoparaffinic, aromatic, naphthenic, olefinic, dienes, terpenes, polymeric or halogenated), either as single compounds or multi-component materials. Some examples of the solvents include natural terpenes and their hydrogenated derivatives or any individual hydrocarbon or hydrocarbons or even a virgin untreated hydrocarbon having requisite characteristics, but usually it is a hydrocarbon fraction obtained as a product or by-product in a petroleum refining process. Furthermore, aromatic solvents (toluene, xylene, mixed xylenes), virgin naphtha, terpenes and hexanes are solvents which might be obtained from other refining processes in the facility. In a preferred embodiment, the solvent source includes a non-polar organic solvent. Combinations of solvents as described above might be used as well.

In a preferred embodiment, the boiling point of the hydrocarbon solvent(s) used is less than 450° C. (about 850° F.), and the solvents are hydrocarbons ranging from C1 to C50 hydrocarbons. Solvent systems containing multiple compounds as solvents may also be used, wherein the multiple compounds may have different boiling points. Generally, the solvents may be a distillate boiling range material that have a boiling range from about 165° C. to about 350° C. (about 330° F. to 650° F.). Within this range, the solvents may be either a light or a heavy distillate. However, more volatile hydrocarbons may also be used. For example, hydrocarbons in the gasoline boiling range or even dry gas, may be used as well.

Several major advantages may be achieved using the presently disclosed methods. The packed media in reactors and adsorbent chambers become spent over the course of its operating life. For instance, catalyst may lose its catalytic activity, active sites may become plugged with contaminants and pressure drop may increase. The cleaning methods of the prior art are all aimed at removing as much of the organic contaminants as possible to allow for safe removal of the spent media. However, these methods are often not effective at removing all of the contaminants to a point where the media may be removed from the reactor without subsequent safety issues. The powerful solvent strength and unique delivery method described in this disclosure allow for more efficient and effective removal of organic contaminants from catalyst and adsorbent beds, therefore increasing the likelihood that the hazardous contaminants will be completely removed prior to handling. Using previously disclosed method, equipment may test clear of noxious gases immediately after cleaning, but noxious gases may appear later during or after dumping because pockets of contamination may be exposed and release more contaminants. By contrast, because the presently disclosed process removes the contaminants more completely than prior methods, it provides a safer process for disposition of the material without fear of fires or hazardous exposures to workers.

Moreover, many previously disclosed methods depend on lengthy procedures of purging and venting using heat and dilution to remove contaminants from equipment. The present invention achieves the same results in a fraction of the time because of the use of the solvents. According to the present disclosure, it is possible to reduce the time required for rendering a particular piece of equipment safe for entry by several hours or even days. This reduction in cleaning time results in increased on-stream time for the affected unit, and thus helps recapturing revenue that would otherwise be lost if other methods of cleaning are used.

Additionally, the decreased timeline required to render equipment free of organic contaminants and noxious gases may also lead to less manpower and materials used to achieve the goal. For instance, substantial cost savings may be realized by using less nitrogen, which usually has to be delivered via truck to the facility. Although the invention will utilize similar flow rates of nitrogen to the current art, less nitrogen will be needed for the present method because the present method can achieve the same results in less time.

It is not uncommon that equipment may become fouled with organic contamination to the point where operating rates must be reduced to prevent catastrophic failure or a shutdown of the entire unit. One skilled in the art will be able to recognize opportunities to apply the present invention in specific instances while the equipment is still operating to remove the organic contamination and return the equipment to a clean state. The benefit of this option for refiners and petrochemical plants is that they may be able to avoid or postpone total shutdowns and may be able to increase operating rates which would otherwise be constrained by the fouled equipment.

EXAMPLES

The following examples are provided to illustrate the present disclosure but not to limit the scope of the disclosure. Other applications of the disclosed process with or without modification will be apparent to one skilled in the art.

Field tests have been conducted to prove the uniqueness and viability of the present invention. One example of the invention is described herein as described below and illustrated in FIG. 1. As illustrated in FIG. 1, a typical process system includes a feed drum (1), a slow roll compressor (2), a furnace (3), a reactor (4), heat exchangers (5), a compressor (6), a separator (7), a low point drain (8), an injection point (9), adjust fin fan exchanger (10), a sample point (11), and a trim cooler (12).

In a typical chemical process system, such as a refinery, the starting material first enters a feed drum (1) which provides material feed surge capacity for the process. From the surge drum, process fluid is passed through a feed preheat exchanger (2) used to both heat the starting material stream before entering the furnace and partially cool reactor effluent. Before entering the reactor (4) the process fluid is passed through a furnace (3) where it is heated to an initial reaction temperature. Once in the reactor (4) the fluid reacts with a catalyst bed in the presence of high pressure hydrogen to generate the desired product(s) which then exit the reactor as a very hot effluent stream. This hot effluent stream is used to preheat the reactor feed at exchanger (2) and used to produce utility steam in reboiler (5). The hot effluent stream is further cooled in the fin fan exchanger (10) and trim cooler (12). Finally, the effluent reaches the separator drum (7) where it is depressured and passed on for further refinery processing. A gaseous steam is drawn from the top of the separator drum (7). A continuous process loop is formed as the recycle compressor (6) circulates the gaseous stream which joins the initial feed stream at the preheat exchanger (2). The purpose of the recycle compressor is to move a high volume of hydrogen across the reactor catalyst bed.

In cases where systems to be cleaned include additional equipment, or fewer equipment, for instance, if the individual reactor is the only equipment that needs to be cleaned, the disclosed process may be adapted by one of skill in the art. The procedure outlined below contains steps that may be taken in a typical cleaning procedure. These steps may be modified according to the specific situation as may be determined by one of ordinary skill in the art.

PROCEDURE

Step 1: Shut-Down or Isolation of Equipment

Follow normal shut down procedures if it is desirable or necessary to shut down the unit(s) to be cleaned. The shut-down procedure may include pulling feed from the unit or units and/or isolating the equipment to be cleaned from the rest of the process system. Isolation may be accomplished by valving off the equipment to be treated.

Step 2: Hydrogen Sweep

Next, A hot hydrogen sweep may be performed to remove residual hydrocarbon from certain part of the system, such as the catalyst bed. This step is optional, but has proven helpful in most cases. By "sweeping" the circuit with hot hydrogen, i.e., pressuring the system with hydrogen and using the furnace to heat the vapor space, much of the residual liquid hydrocarbon is vaporized and allowed to pass as a liquid to subsequent refinery processing equipment. The hydrogen is then recycled back to the feed circuit.

Step 3: Cooling Down.

The system is cooled down to about 450 F. or lower. The system may be cooled down gradually using the fin fans (10) and trim cooler (12) and as cool hydrogen is recycled back into the feed loop. In some facilities, nitrogen is injected into the system to facilitate the cooling step. The rate at which the unit is cooled may be limited by the rate at which the thick iron of the reactor gives up heat. Normally the unit will cool at a rate of 50 F to 100 F/hour.

Step 4: Isolation of the Reactor Circuit from Fractionator and Feed Drum (1).

The reactor circuit is isolated from the fractionator and feed drum by inserting flange blinds or closing valves at the outlet of the feed surge drum pumps and at vent/drain (8).

Step 5: Slow Roll Compressor (6).

The compressor (6) is started and allowed to operate at an idle speed that is significantly slower than that used for unit processing operation. In this step, a slow operating speed allows the compressor to pass vapor from the inlet to the outlet—necessary for establishing a complete circuit—with no damage to the compressor while the system is depressured.

Step 6: Depressurizing the System.

The system including furnace (3), reactor (4), heat exchangers (5) and (10), compressor (6) and separator (7) is depressurized and the atmosphere is allowed to change to 95% nitrogen.

More specifically, during this step, the hot hydrogen is purged from the system using nitrogen so that when complete, nitrogen constitutes at least 95% of the circuit's internal atmosphere. This may be accomplished using a process commonly known as "huff and puff" in the industry. More specifically, hydrogen is vented from the circuit to achieve atmospheric pressure, the circuit is then repressurized by the introduction of nitrogen. The nitrogen is then allowed to vent so that the circuit returns to atmospheric pressure. This procedure may be divided into at least 3 sub-steps (a)-(c):

(a) Allowing residual hydrogen to escape to the flare or other gas processing system through vent and drain (8) so that the residual system pressure falls below 10 psig;
(b) Increasing the system pressure as high as practical by injecting nitrogen gas through injection point (9); and
(c) Repeating steps (a) and (b) so that a grab sample of the gas exiting the vent point (8) measures at least 95% nitrogen when tested using gas chromatography (GC).

Alternatively, the same procedure has been used to backfill the circuit with natural gas in lieu of nitrogen. Natural gas is readily available in the refinery and may be processed by the refinery after being used in cleaning. Nitrogen and natural gas work equally well as a transport system for the cleaning process.

Step 7: Bringing Compressor (6) up to Max Speed.

With the circuit filled with 95% nitrogen (or natural gas), the compressor is sped up to maximum operating speed. With the compressor operating at full speed, a gas circulation loop is established from the compressor (6) through exchanger (2) and furnace (3), into reactor (4) and back to the compressor (6) through exchangers (5, 10 and 12) and separator (7). The circulation loop helps move the cleaning chemistry to all parts of the circuit in subsequent steps.

Step 8: Cooling Down.

Adjust fin fan exchanger (10) to maintain outlet temperature as warm as possible without reaching high compressor discharge limit.

The cleaning process is most effective at an elevated temperature, for example, between 180 F to 400 F, and more preferably, between 350 F and 400 F. The fin fan exchanger (10) in the circuit provides cooling necessary to control the temperature of the cleaning process by expanding the gas prior to the separator and compressor. Normally, the discharge shutdown temperature of a recycle compressor is about 350 F.

Step 9: Adjusting Outlet Temperature.

Adjust fin fan exchanger (10) to maintain outlet temperature as warm as possible without reaching high compressor discharge limit.

Step 10: Ensuring that the Low Point Drain (8) is Liquid Free.

Step 11: Sampling at Vent (8) for GC Analysis at 400 F.

Step 12: Injecting Solvent.

Inject solvent over approximately 2 hours at injection point (9) into reactor system during cool down starting at about 400 F.

Step 13: Sampling.

After the first hour of injection, take a sample from the recycle gas stream for analysis of LEL and noxious gas at vent (8).

Step 14: Maintaining System Temperature Above 350 F Until Injection is Complete.

Step 15: Maintaining Low Point Drain (8) Liquid Free.

Step 16: Sampling.

After injection, take a sample of recycle gas stream at sample point (11) for analysis. Continue sampling the stream until the Reactor atmosphere reaches the environmental limits to block off to flare and open to atmosphere.

Step 17: Continuing Cool Down to Atmosphere According to Normal Procedure.

Thus, there have been shown and described methods for cleaning a vessel in a refinery which fulfills all of the object and advantages sought therefore. Many changes, modifications, variations, and other uses and applications of the subject invention will, however, become apparent to those skilled in the art after considering this specification together with the accompanying figures and claims. All such changes, modifications, variations and other uses and applications which do not depart from the spirit and scope of the invention are deemed to be covered by the invention which is limited only by the claims which follow.

The invention claimed is:

1. A method for removing a contaminant from a process system, comprising the steps of:
   (i) providing a water-free carrier gas source;
   (ii) providing a non-aqueous solvent source;
   (iii) volatilizing non-aqueous solvent from the non-aqueous solvent source in water-free carrier gas from the carrier gas source and delivering the carrier gas containing the volatilized non-aqueous solvent to the process system and
   (iv) removing said contaminant out of said system, wherein a substantial amount of said contaminant is dissolved in said solvent in a vapor or liquid state as it is being removed from said system.

2. The method of claim 1, wherein the process system is selected from the group consisting of a reactor, an absorbent chamber containing a molecular sieve, and a pressure vessel.

3. The method of claim 1, wherein the process system comprises a reactor circuit used in a refining hydrotreating process and associated equipment.

4. The method of claim 1 wherein the carrier gas is at least one member selected from the group consisting of inert gas, purchase fuel gas and hydrogen.

5. The method of claim 1 wherein the carrier gas is at least one dry gas with the chemical formula $C_nH_{2n+2}$, wherein n is an integer greater than 0 but less than 6.

6. The method of claim 1 wherein the carrier gas is hydrogen.

7. The method of claim 6 wherein said organic contaminant comprises at least one member selected from the group consisting of crude oil and its derivatives, hydrocarbons and noxious gases.

8. The method of claim 6, wherein said organic contaminant is a noxious gas, said noxious gas being at least one member selected from the group consisting of hydrogen sulfide, benzene, carbon monoxide, and a light end hydrocarbon, said light end hydrocarbon being capable of resulting in a positive reading when tested for the Lower Explosive Limit (or "LEL").

9. The method of claim 1, wherein the carrier gas containing the volatilized solvent is circulated through the system using a compressor.

10. The method of claim 1, wherein the temperature of the equipment in the system is adjusted to a range of between 225 F and 400 F prior to the introduction of the solvent.

11. The method of claim 1 wherein the solvent is introduced into the carrier gas by connecting the gas and solvent sources.

12. The method of claim 1 wherein the solvent is a non-polar organic solvent.

13. The method of claim 1 wherein the solvent is a C1-C50 hydrocarbon.

14. The method of claim 1 wherein the solvent comprises at least one member selected from the group consisting of aliphatic, paraffinic, isoparaffinic, aromatic, naphthenic, olefinic, diene, terpene, polymeric or halogenated hydrocarbon, and wherein the solvent is a naturally occurring, synthetic or processed organic solvent.

15. The method of claim 1 wherein the solvent is a natural terpene or its hydrogenated derivatives.

16. The method of claim 1 wherein the solvent is a processed solvent selected from the group consisting of an aromatic solvent, virgin naphtha, terpene and hexane.

17. The method of claim 1 wherein the solvent comprises one or more organic compounds.

18. The method of claim 1 wherein the solvent is delivered to the system as a vapor and the volumetric or weight ratio of said solvent vapor and the carrier gas is accurately controlled.

19. The method of claim 18 wherein the weight ratio between said solvent vapor and said carrier gas is in the range of about 0.1 to about 6.

20. The method of claim 18 wherein the weight ratio between said solvent vapor and said carrier gas is in the range of about 2 to about 4.

* * * * *